(12) United States Patent
Narea et al.

(10) Patent No.: US 7,532,881 B2
(45) Date of Patent: May 12, 2009

(54) APPARATUS AND METHOD FOR LIMITING COMMUNICATION RANGE OF FIXED WIRELESS TERMINAL

(75) Inventors: Jaime Narea, Parkland, FL (US); Seo Kab Sik, Bupyung Gu Incheon (KR)

(73) Assignees: Narbitec, LLC, Miami, FL (US); Telian Corporation, Kyunggi-Do (KR)

( * ) Notice: Subject to any disclaimer, the term of this patent is extended or adjusted under 35 U.S.C. 154(b) by 167 days.

(21) Appl. No.: 11/253,303

(22) Filed: Oct. 19, 2005

(65) Prior Publication Data

US 2006/0084418 A1    Apr. 20, 2006

(30) Foreign Application Priority Data

Oct. 19, 2004   (KR) .............. 10-2004-0083679

(51) Int. Cl.
*H04M 3/00*  (2006.01)
(52) U.S. Cl. .............. 455/418; 455/426; 455/421; 455/406
(58) Field of Classification Search ........ 455/418, 455/403, 426, 421, 406; 370/350
See application file for complete search history.

(56) References Cited

U.S. PATENT DOCUMENTS

| | | | |
|---|---|---|---|
| 6,301,475 B1 | 10/2001 | Saarela et al. | |
| 6,647,103 B2* | 11/2003 | Pinard et al. | 379/110.01 |
| 6,792,260 B1 | 9/2004 | Ezuriko | |
| 2002/0115455 A1* | 8/2002 | Umstetter et al. | 455/462 |
| 2002/0127967 A1 | 9/2002 | Najafi | |
| 2002/0147009 A1* | 10/2002 | Kocheisen | 455/426 |
| 2002/0172336 A1* | 11/2002 | Postma et al. | 379/110.01 |
| 2003/0039360 A1 | 2/2003 | Younis | |
| 2003/0157929 A1* | 8/2003 | Janssen et al. | 455/416 |
| 2005/0197061 A1* | 9/2005 | Hundal | 455/41.2 |

FOREIGN PATENT DOCUMENTS

| | | |
|---|---|---|
| EP | 1408708 | 4/2004 |
| JP | 10243059 | 9/1998 |
| JP | 10243090 | 9/1998 |
| JP | 2001-345924 | 12/2001 |
| JP | 2002-330220 | 11/2002 |

* cited by examiner

*Primary Examiner*—David Q Nguyen
(74) *Attorney, Agent, or Firm*—K & L Gates LLP

(57) ABSTRACT

Disclosed are an apparatus and a method for limiting a communication range of a fixed wireless terminal. The method comprises the steps of generating and radio-transmitting communication maintaining data through a transmitting unit in a fixed device; receiving, through a receiving unit of a mobile device, the communication maintaining data transmitted from the fixed device, and judging by a receiving processor whether or not the inputted communication maintaining data corresponds to that stored in the receiving processor; outputting a communication permitting signal from the receiving processor to a CPU when the inputted communication maintaining data corresponds to that stored in the receiving processor, to maintain communication; and outputting a communication forbidding signal from the receiving processor to the CPU when the inputted communication maintaining data does not correspond to that stored in the receiving processor, to interrupt communication.

5 Claims, 6 Drawing Sheets

APPARATUS AND METHOD FOR LIMITING COMMUNICATION RANGE OF FIXED WIRELESS TERMINAL

CROSS-REFERENCE TO RELATED APPLICATION

This application is a non-provisional application claiming the priority of Korean Patent Application No. 2004-0083679 filed Oct. 19, 2004 in the Korean Intellectual Property Office.

BACKGROUND OF THE INVENTION

1. Field of the Invention

The present invention relates to a fixed wireless terminal (FWT) which is constructed by a mobile phone, and more particularly to an apparatus and a method for limiting a communication range of a fixed wireless terminal, which interrupt communication through a mobile phone when the mobile phone is not within a predetermined range from a fixed device.

2. Description of the Prior Art

In the conventional art, in order to use a telephone in a mountainous region or an island, it is necessary to install a telephone line, which requires a significant expense.

In this consideration, recently, telecommunication through a fixed wireless terminal (FWT) has been disclosed in the art. The fixed wireless terminal is fixed indoors to serve only as a fixed device.

The FWT allows a mobile phone to be used in a room as if it were a wired telephone at a place where a telephone line is not installed or in a region where a call charge when using the FWT is cheaper than that when using a wired telephone. The FWT is one type of communication services, which is suggested by a communication service provider.

In the FWT, as shown in FIG. 1, a fixed device 100 can communicate with a base station 150 using an antenna 120 of a mobile phone. Power is supplied to the fixed device 100 using an adapter 110. The fixed device 100 and a handset 140 are connected to each other by a cord 130 to allow the FWT to perform the same function as a wired telephone.

FIG. 2 illustrates another conventional FWT. In this type of FWT, a battery of a mobile phone 130 is removed, and the mobile phone 130 is connected with a fixed device 100 by a cord 120. The fixed device 100 is connected with a power supply device 110 so that power can be supplied to the mobile phone 130 through the fixed device 100 and the mobile phone 130 can directly communicate with a base station 140 to perform the same function as a wired telephone.

However, in these types of FWTs, since communication is made possible only at a place where a fixed device is installed, mobility of the terminal in a room cannot but be limited to a certain extent. That is to say, it is possible to make and receive telephone calls only at a place where the fixed device is installed.

Therefore, because the FWT cannot be used as a cordless telephone and only can be used as if it were a wired telephone, it is inconvenient to use the FWT.

SUMMARY OF THE INVENTION

Accordingly, the present invention has been made to solve the above-mentioned problems occurring in the prior art, and an object of the present invention is to provide an apparatus and a method for limiting a communication range of a fixed wireless terminal, which allow a mobile phone to be used like a cordless phone within a predetermined range, thereby improving mobility of the fixed wireless terminal.

In order to achieve the above object, according to one aspect of the present invention, there is provided an apparatus for limiting a communication range of a fixed wireless terminal, comprising: a fixed device for periodically radio-transmitting communication maintaining data; and a mobile device serving as a mobile phone which is enabled to communicate with a base station only when communication maintaining data is inputted thereto, the fixed device comprising a transmitting processor for controlling generation of communication maintaining data, and a transmitting unit for generating and radio-transmitting communication maintaining data under the control of the transmitting processor, and the mobile device comprising a battery for supplying power, a CPU for taking charge of mobile telecommunication, a transceiver unit for implementing communication under the control of the CPU, a voice processing unit, a handset unit having a speaker and a microphone, a receiving unit for receiving communication maintaining data from the transmitting unit of the fixed device, and a receiving processor for controlling operation of the CPU which administrates entire functions of the mobile phone by judging whether or not the communication maintaining data inputted through the receiving unit corresponds to that stored in the receiving processor.

According to another aspect of the present invention, there is provided a method for limiting a communication range of a fixed wireless terminal comprising a fixed device for periodically radio-transmitting communication maintaining data and a mobile device serving as a mobile phone for communicating with a base station only when communication maintaining data is inputted thereto from the fixed device, the method comprising the steps of: generating and radio-transmitting communication maintaining data through a transmitting unit in the fixed device; receiving, through a receiving unit of the mobile device, the communication maintaining data transmitted from the fixed device, and judging by a receiving processor whether or not the inputted communication maintaining data corresponds to that stored in the receiving processor; outputting a communication permitting signal from the receiving processor to a CPU when the inputted communication maintaining data corresponds to that stored in the receiving processor, to maintain communication; and outputting a communication forbidding signal from the receiving processor to the CPU when the inputted communication maintaining data does not correspond to that stored in the receiving processor, to interrupt communication.

BRIEF DESCRIPTION OF THE DRAWINGS

The above and other objects, features and advantages of the present invention will be more apparent from the following detailed description when taken in conjunction with the accompanying drawings, in which.

DETAILED DESCRIPTION OF THE PREFERRED EMBODIMENTS

Figure 1:
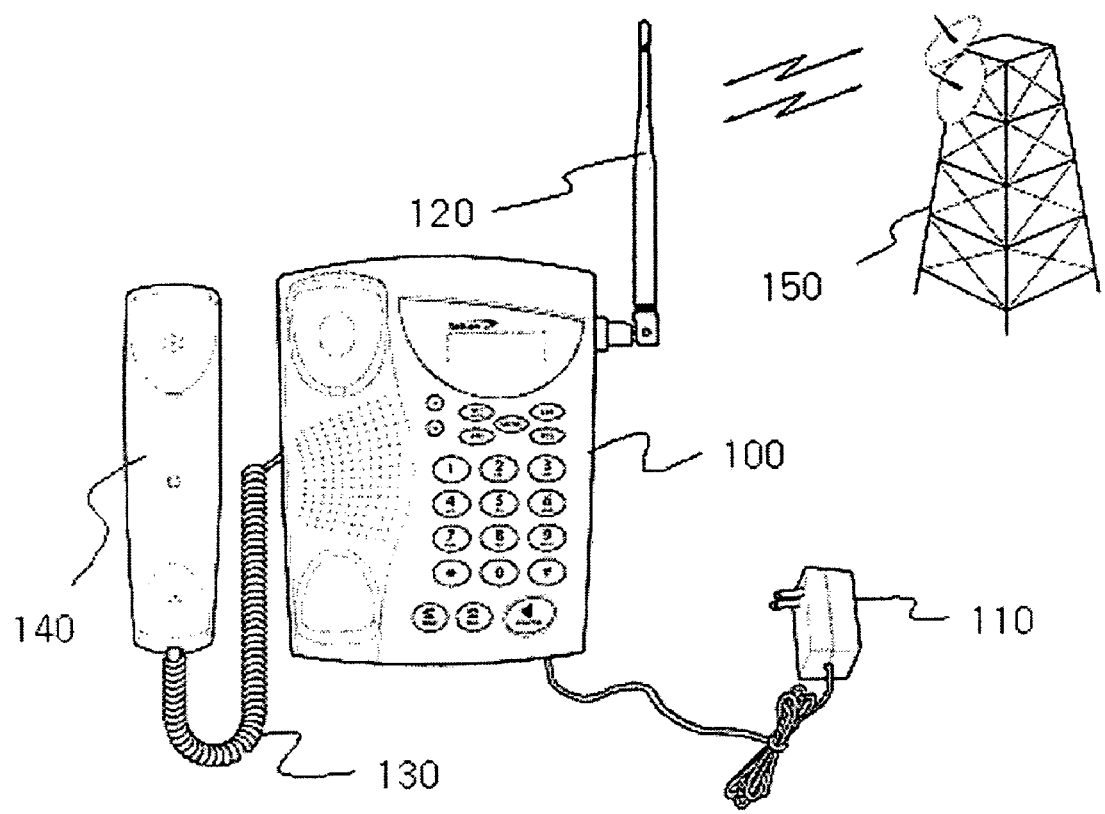
FIGS. 1 and 2 are systematic diagrams illustrating examples of a conventional fixed wireless terminal.
Figure 2:
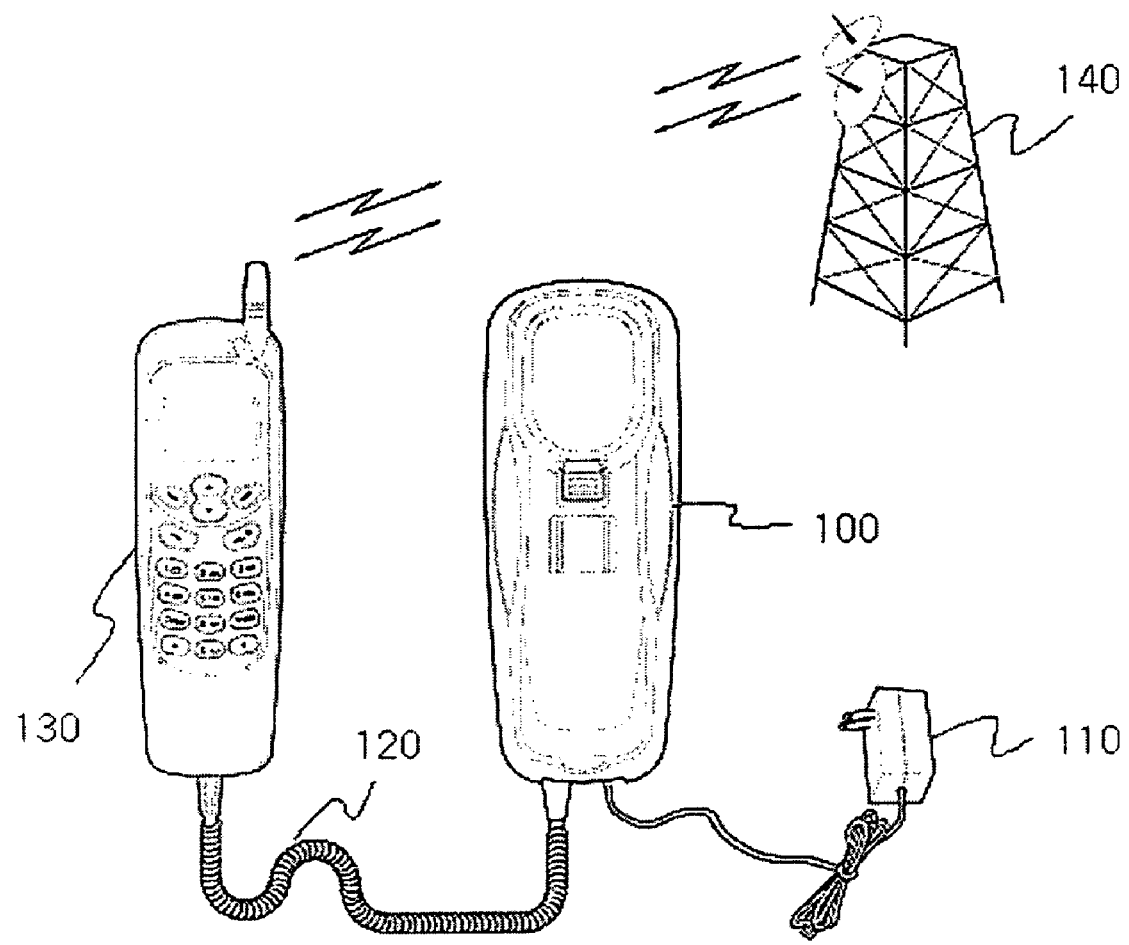

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3:
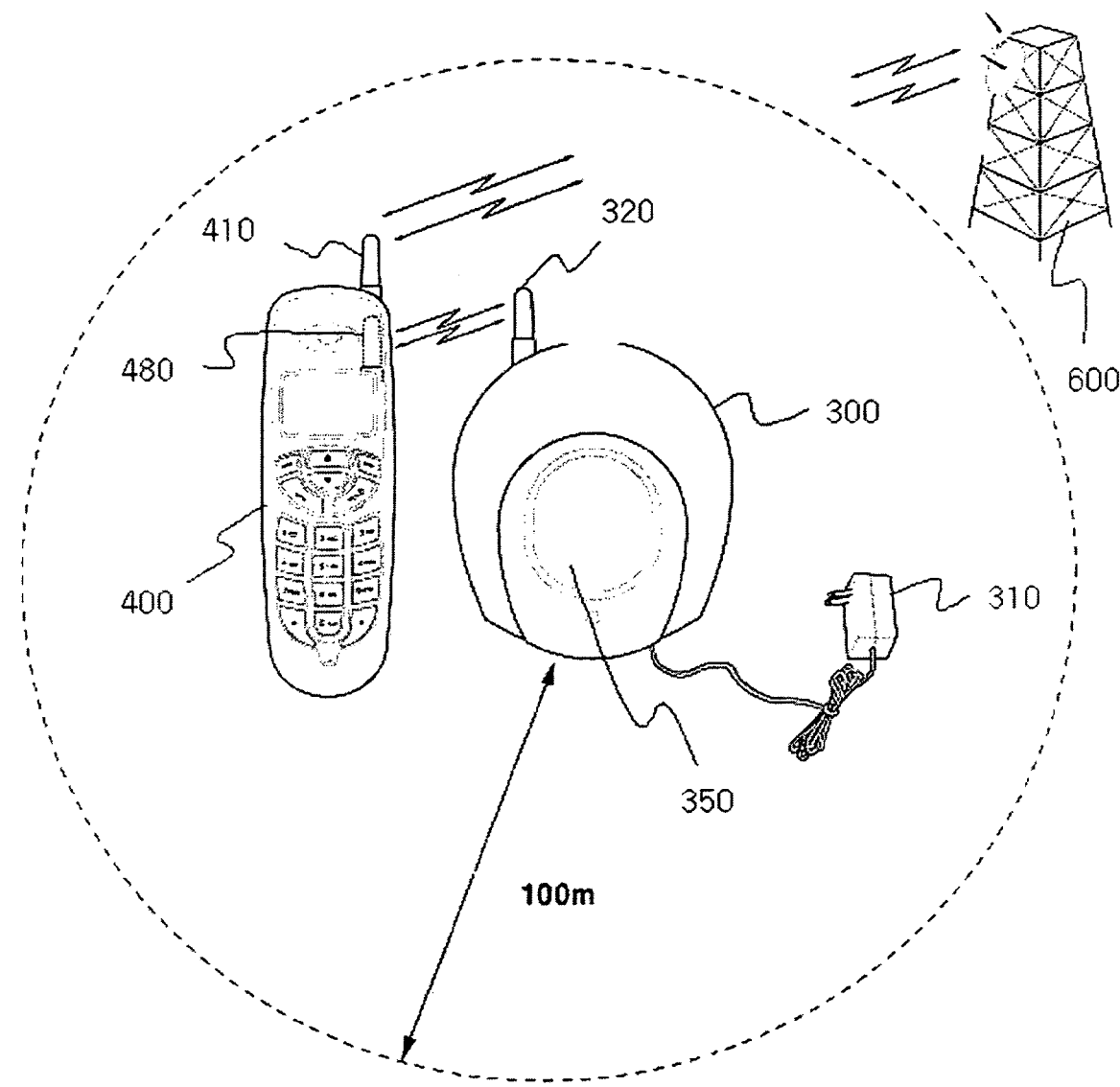
FIG. 3 is a systematic diagram illustrating an apparatus for limiting a communication range of a fixed wireless terminal in accordance with an embodiment of the present invention.

FIG. 3 illustrates a fixed wireless terminal (FWT) in accordance with an embodiment of the present invention. The fixed wireless terminal comprises a fixed device 300 which is fixed to a wall, a table, etc. in a room. The fixed device 300 is supplied with power through a power supply device 310 and periodically transmits communication maintaining data through an antenna 320.

The fixed device 300 is provided with a charging unit 350 to which a mobile phone constituting a mobile device can be attached to be charged with power. By this fact, power supplied through the power supply device 310 can be charged to the mobile phone, and wireless communication can be implemented through the mobile phone.

The mobile device 400 is allowed to communicate with a base station 600 through an antenna 410 only when communication maintaining data is inputted thereto from the fixed device 300 and the inputted communication maintaining data corresponds to that stored therein.

The fixed device 300 uses allowable frequencies which can be used without obtaining separate permission. For example, since the fixed device 300 transmits communication maintaining data at a level of 94 dBuV which is an RF intensity regulated using a TX RF module of an ISM (industrial, scientific and medical) band, the mobile phone can be used as a cordless telephone within a radius of about 100 meters in which an electric field intensity can reach the mobile phone to be received by an RX RF module provided to the mobile device 400.

The ISM band includes frequencies 46-49 MHz, 400 MHz, 900 MHz, 2.4 GHz and 5.8 GHz which can be used without obtaining separate permission.

Figure 4:
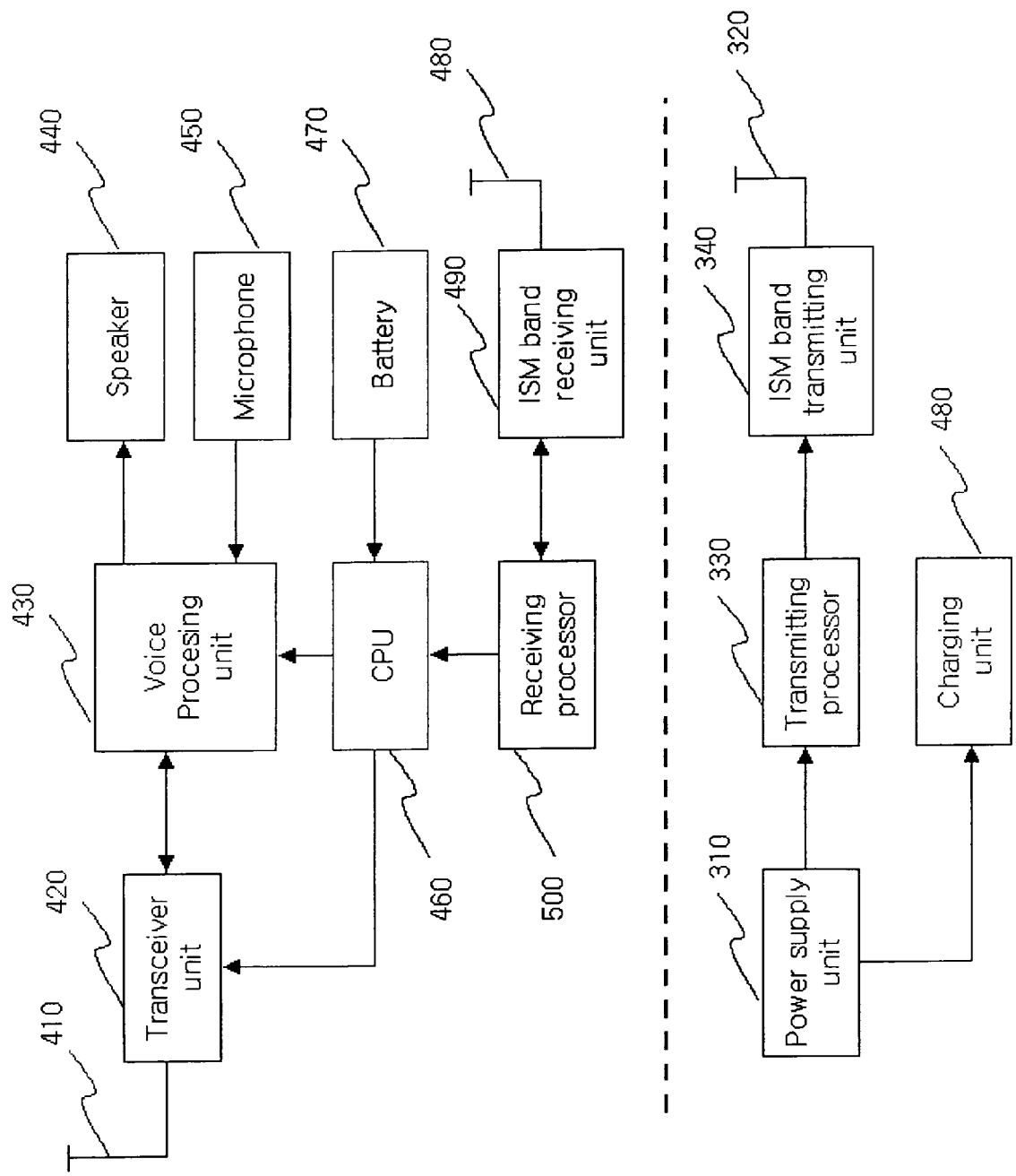
FIG. 4 is a block diagram illustrating an internal circuit of the apparatus shown in FIG. 3.
Figure 5:
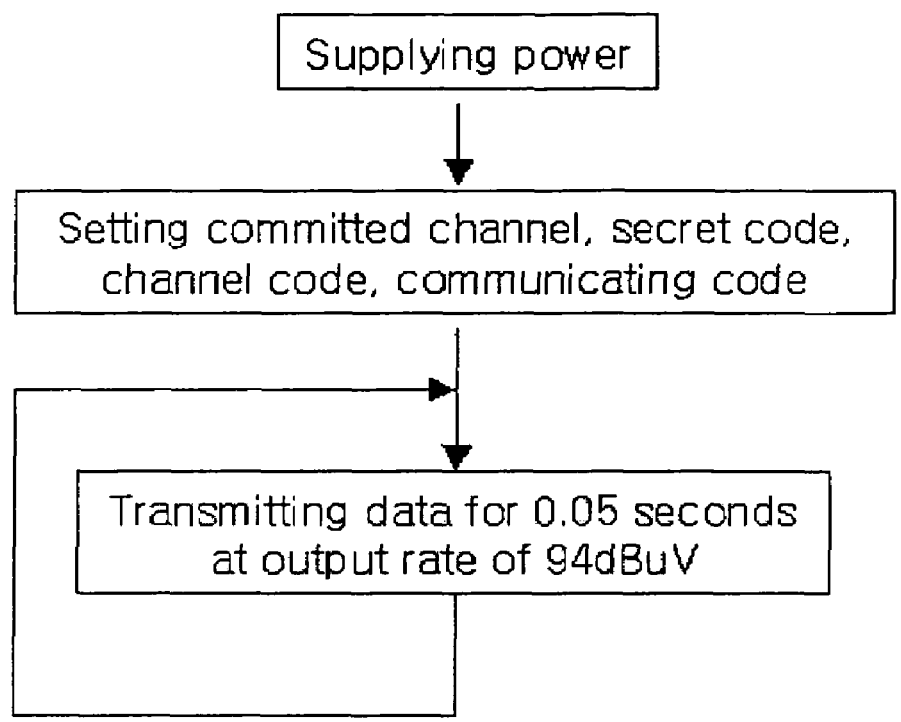
FIGS. 5 and 6 are flow charts for explaining a method for limiting a communication range of a fixed wireless terminal in accordance with another embodiment of the present invention.
Figure 6:
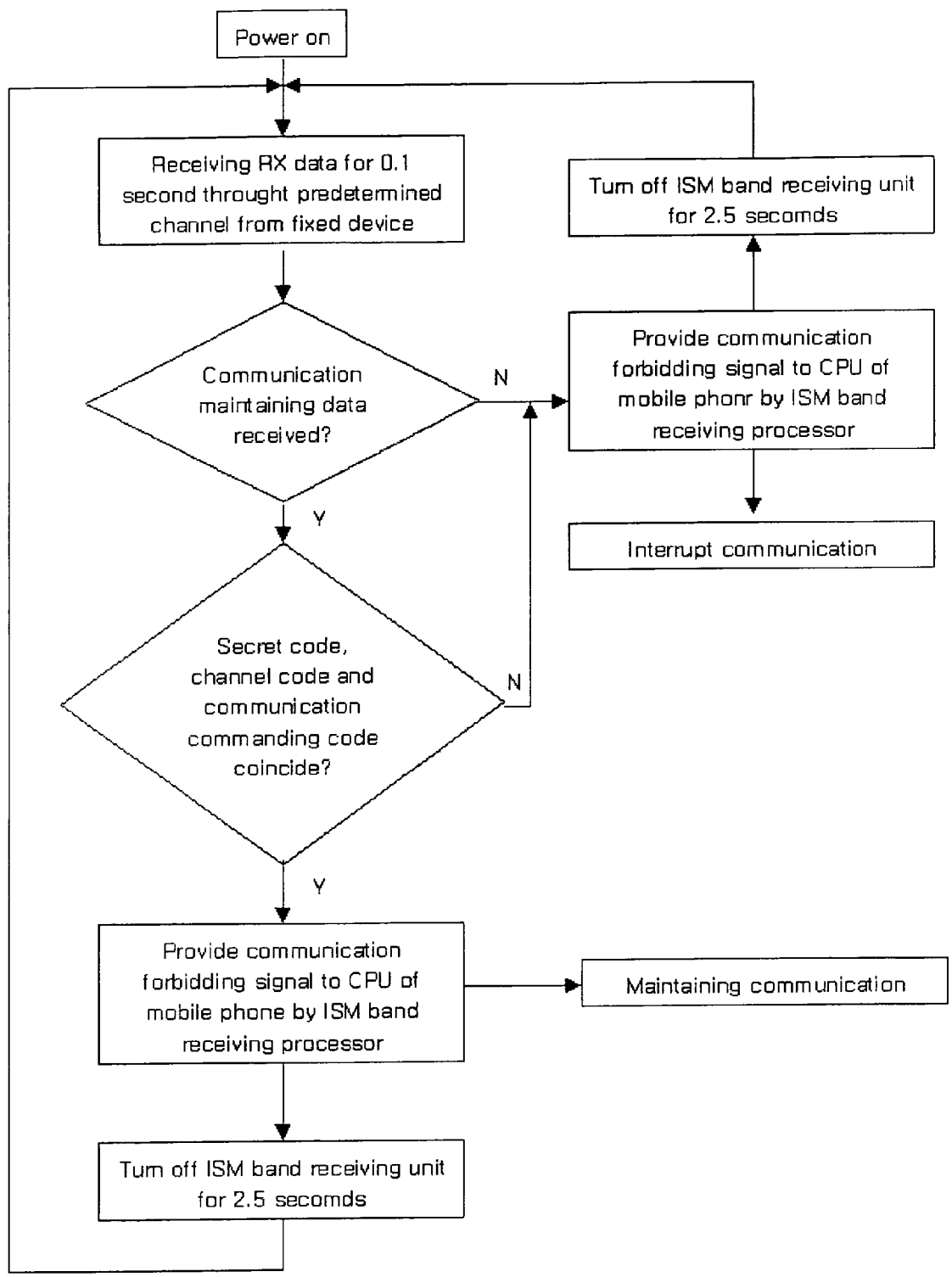

FIG. 4 is a block diagram illustrating an internal circuit of the apparatus shown in FIG. 3; and FIGS. 5 and 6 are flow charts for explaining a method for limiting a communication range of a fixed wireless terminal in accordance with another embodiment of the present invention.

An ISM band transmitting processor 330 receives power through the power supply unit 310 and controls an ISM band transmitting unit 340 to generate communication maintaining data. When power is supplied to the ISM band transmitting processor 330, the ISM band transmitting processor 330 sets a channel, a secret code, a channel code, and a communication command code to the ISM band transmitting unit 340.

Under the control of the ISM band transmitting processor 330, the ISM band transmitting unit 340 periodically radio-transmits, via the antenna 320 at a level of 94 dBuV as an RF intensity regulated for an ISM band, communication maintaining data comprising 16 bits of secret code, 8 bits of channel code and the communication command code, through a channel which is predetermined to be used between the ISM band transmitting unit 340 of the fixed device 300 and a ISM band receiving unit 490 of the mobile device 400.

The ISM band receiving unit 490 of the mobile device 400 receives, via an antenna 480, communication maintaining data transmitted from the fixed device 300, for 0.1 second through the predetermined channel. Then, the ISM band receiving unit 490 provides the received communication maintaining data to an ISM band receiving processor 500.

At this time, if communication maintaining data is not inputted to the ISM band receiving unit 490, the ISM band receiving processor 500 outputs a communication forbidding signal to a CPU 460. Thereupon, the CPU 460 interrupts operation of a transceiver unit 420 and a voice processing unit 430.

In this way, communication through the mobile phone is interrupted. In this case, the mobile phone is positioned at a place where the RF intensity of 94 dBuV generated by the fixed device 300 cannot reach the mobile phone. That is to say, the mobile phone is out of a possible communication range.

In the case that communication maintaining data is inputted to the ISM band receiving unit 490 and provided to the ISM band receiving processor 500, the ISM band receiving processor 500 judges whether or not the inputted communication maintaining data corresponds to communication maintaining data which is already stored in the ISM band receiving processor 500 and comprises a secret code, a channel code and a communication command code. When the inputted data does not correspond to the stored data, the ISM band receiving processor 500 outputs the communication forbidding signal to interrupt communication through the mobile terminal 400 through the above-described procedure.

When the inputted data corresponds to the stored data, the ISM band receiving processor 500 outputs a communication permitting signal to the CPU 460, whereby the CPU 460 enables the transceiver unit 420 and the voice processing unit 430.

By this fact, a user can implement communication through a handset unit which comprises a speaker 440 and a microphone 450, and the transceiver unit 420 can communicates with the base station 600 via the antenna 410.

In the meanwhile, in order to prevent unnecessary power consumption of a battery 470, the ISM band receiving processor 500 disables operation of the ISM band receiving unit 490 for 2.5 seconds after it outputs the communication permitting signal or communication forbidding signal to the CPU 460.

As apparent from the above description, the present invention provides advantages in that, in constructing a fixed wireless terminal (FWT), since a mobile phone (TDMA, CDMA, GSM and other mobile terminal) can be used like a cordless phone within a predetermined distance range, mobility of the fixed wireless terminal is improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for limiting a communication range of a fixed wireless terminal, comprising:
   a fixed device for periodically radio-transmitting communication maintaining data, wherein the communication maintaining data comprises a secret code, a channel code and a communication command code; and
   a mobile device to receive the communication maintaining data via a first wireless communication channel and to enable communication between the mobile device and a base station via a second wireless communication channel only when the communication maintaining data is being received by the mobile device;

the fixed device comprising a transmitting processor for controlling generation of the communication maintaining data, and a transmitting unit for generating and radio-transmitting the communication maintaining data under the control of the transmitting processor; and the mobile device comprising a battery for supplying power, a CPU for taking charge of mobile telecommunication, a transceiver unit for implementing communication under the control of the CPU, a voice processing unit, a handset unit having a speaker and a microphone, a receiving unit for receiving the communication maintaining data from the transmitting unit of the fixed device, and a receiving processor for controlling operation of the CPU which administrates entire functions of the mobile phone by judging whether or not the communication maintaining data inputted through the receiving unit corresponds to that stored in the receiving processor.

2. The apparatus as claimed in claim 1, wherein the fixed device further comprises a charging unit for charging operation power to the battery of the mobile device.

3. The apparatus as claimed in claim 1, wherein the transmitting unit of the fixed device and the receiving unit of the mobile device communicate with each other using an allowable frequency which can be used without obtaining separate permission.

4. A method for limiting a communication range of a fixed wireless terminal, the fixed wireless terminal comprising a fixed device for periodically radio-transmitting communication maintaining data and a mobile device serving as a mobile phone for communicating with a base station only when the communication maintaining data is inputted thereto from the fixed device, the method comprising the steps of:

generating and periodically radio-transmitting the communication maintaining data through a transmitting unit in the fixed device, wherein the communication maintaining data comprises a secret code, a channel code and a communication command code;

receiving the communication maintaining data into a receiving unit in the mobile device via a first wireless communication channel, and judging by a receiving processor in the mobile device whether or not the received communication maintaining data corresponds to communication maintaining data stored in the receiving processor;

outputting a communication permitting signal from the receiving processor to a CPU in the mobile device when the inputted communication maintaining data corresponds to the communication maintaining data stored in the receiving processor, the communication permitting signal to maintain communication between the mobile phone and the base station via a second wireless communication channel; and outputting a communication forbidding signal from the receiving processor to the CPU in the mobile device when the inputted communication maintaining data does not correspond to the communication maintaining data stored in the receiving processor, the communication forbidding signal to interrupt communication between the mobile phone and the base station via the second wireless communication channel.

5. The method as claimed in claim 4, wherein the transmitting unit of the fixed device and the receiving unit of the mobile device communicate with each other using an allowable frequency which can be used without obtaining separate permission.

* * * * *